(12) United States Patent
Jensen

(10) Patent No.: US 7,394,881 B2
(45) Date of Patent: Jul. 1, 2008

(54) RADIO RECEIVER AND/OR TRANSMITTER INCLUDING A PROGRAMMABLE EQUALIZER

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 741 days.

(21) Appl. No.: 10/911,934

(22) Filed: Aug. 5, 2004

(65) Prior Publication Data

US 2006/0029171 A1 Feb. 9, 2006

(51) Int. Cl.
*H04B 1/10* (2006.01)
(52) U.S. Cl. ........................ 375/350; 375/259; 375/295; 375/316; 375/235
(58) Field of Classification Search .................. 375/235, 375/316, 295, 259, 350
See application file for complete search history.

(56) References Cited

U.S. PATENT DOCUMENTS

2002/0126748 A1 * 9/2002 Rafie et al. ................. 375/229
2003/0031275 A1 * 2/2003 Min et al. ................... 375/326
2003/0058959 A1 * 3/2003 Rafie et al. ................. 375/296

* cited by examiner

*Primary Examiner*—Mohammad H. Ghayour
*Assistant Examiner*—Juan A. Torres
(74) *Attorney, Agent, or Firm*—Garlick Harrison & Markison; Timothy W. Markison; Kevin L. Smith

(57) ABSTRACT

A radio receiver includes a low noise amplifier, a down conversion module, an analog to digital converter, and a digital demodulator. The digital demodulator is operably coupled to convert the digital low IF signals into inbound digital symbols and includes a baseband conversion module, a filtering module, a programmable equalizer, a CORDIC module, and a demodulation module. The programmable equalizer is operably coupled to equalize phase and frequency response of filtered digital baseband signals from the filtering module such that the phase and frequency response of the filtered digital baseband signals approximates phase and frequency response of a square root raised cosine filter to produce adjusted digital baseband signals. The CORDIC module is operably coupled to produce phase and magnitude information from the adjusted digital baseband signals. The demodulation module is operably coupled to produce the inbound digital symbols from the phase and magnitude information.

16 Claims, 10 Drawing Sheets receiver section 68 digital demodulator 116 programmable equalizer 72 filter module 132 response of receiver section 68 response of filter module 132 receiver 68 scatter plot w/o EQ 72 receiver 68 scatter plot w/EQ 72

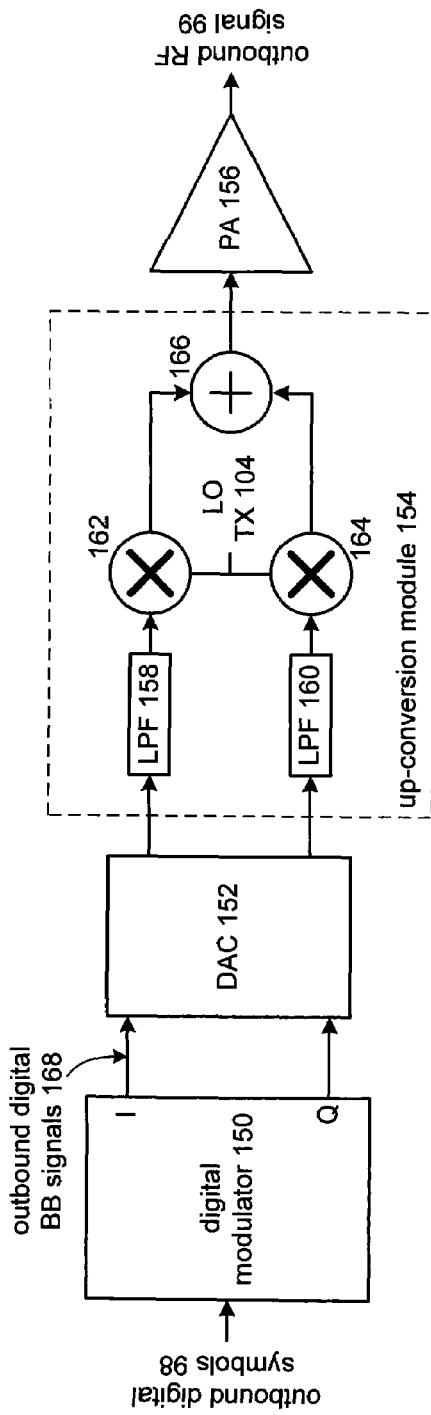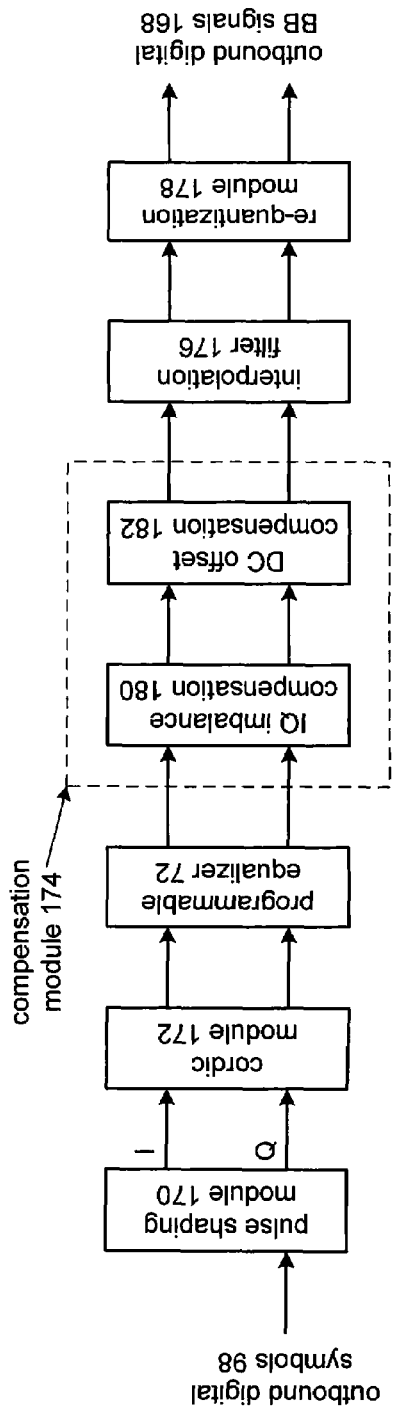
FIG. 11
transmitter section 70
FIG. 12
digital modulator 150 cordic 172 function interpolation filter 176 re-quantization module 178

RADIO RECEIVER AND/OR TRANSMITTER INCLUDING A PROGRAMMABLE EQUALIZER

BACKGROUND OF THE INVENTION

1. Technical Field of the Invention

This invention relates generally to wireless communication systems and more particularly to wireless communication devices used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In an ideal situation, the overall magnitude and frequency response of the receiver has a desired and predictable response that matches the filtering of the transmitter. For instance, for transceivers that employ phase shift keying (PSK) and/or frequency shift keying (FSK), an ideal in-band frequency response is that of a root raised cosine (RRC) filter, which enables the receiver to sample transmitted symbols without inter-symbol interference and hence optimize the transceiver's resistance towards noise and interferers. In practice, a square root raised cosine filter (SRRC) is employed in the transmitter and an identical filter is employed in the receiver to achieve the RRC filtering. This allows for bandwidth the limitations of the transmitted signal typically called for by communications standards. For instance, a version of the Bluetooth standard dictates that the bandwidth of a channel is 1 MHz with attenuation of −20 dB at the edges of the channel. To achieve the bandwidth limitations, the transmitter includes a pulse shaping filter that essentially removes the sharp edges of digital data transitions (e.g., 0 to 1, 1 to 0), but adversely affects the overall desired responses.

Therefore, a need exists for a programmable equalizer that may be used in the receiver and/or transmitter to approximate desired responses in bandwidth limited applications.

BRIEF SUMMARY OF THE INVENTION

The radio receiver and/or transmitter including a programmable equalizer of the present invention substantially meets these needs and others. In one embodiment, a radio receiver includes a low noise amplifier, a down conversion module, an analog to digital converter, and a digital demodulator. The low noise amplifier is operably coupled to amplify inbound radio frequency (RF) signals to produce amplified inbound RF signals. The down conversion module is operably coupled to convert the amplified inbound RF signals into low intermediate frequency (IF) signals. The analog to digital converter is operably coupled to convert the low IF signals into digital low IF signals. The digital demodulator is operably coupled to convert the digital low IF signals into inbound digital symbols and includes a baseband conversion module, a filtering module, a programmable equalizer, a COordinate Rotation DIgital Computer (CORDIC), and a demodulation module. The baseband conversion module is operably coupled to convert the digital low IF signals into digital baseband signals. The filtering module is operably coupled to filter the digital baseband signals to produce filtered digital baseband signals. The programmable equalizer is operably coupled to equalize frequency response of the filtered digital baseband signals such that in-band frequency response of the radio receiver approximates frequency response of a square root raised cosine filter to produce adjusted digital baseband signals. The CORDIC module is operably coupled to produce phase and magnitude information from the adjusted digital baseband signals. The demodulation module is operably coupled to produce the inbound digital symbols from the phase and magnitude information.

In another embodiment, a radio transmitter includes a digital modulator, a digital to analog conversion module, an up-conversion module, and a power amplifier. The digital modulator operably is coupled to convert outbound digital symbols into outbound digital baseband signals and includes a pulse shaping module, a CORDIC module, a programmable equalizer, a compensation module, an interpolation filter, and a re-quantization module. The pulse shaping module is operably coupled to square root raised cosine filter the outbound digital symbols to produce filtered digital symbols. The CORDIC module is operably coupled to convert phase and magnitude information of the filtered digital symbols into outbound signals. The programmable equalizer is operably coupled to produced equalized outbound signals by equalizing frequency response of the outbound signals such that in-band frequency response of the radio transmitter approximates frequency response of a square root raised cosine filter. The compensation module is operably coupled to compensate at least one of an imbalance and DC offset of the equalized outbound signals to produce compensated outbound signals. The interpolation filter is operably coupled to increase sampling rate of the compensated outbound signals to produce up-sampled outbound signals. The re-quantization module is operably coupled to quantize the up-sampled outbound signals to produce the outbound digital baseband signals. The digital to analog conversion module is operably coupled to convert the outbound digital baseband signals into outbound analog baseband signals. The up-conversion module is operably coupled to convert the outbound analog baseband signals into pre-amplified outbound RF signals. The power amplifier is operably coupled to amplify the pre-amplified outbound RF signals to produce the outbound RF signals.

In yet another embodiment, a radio transceiver includes a receiver section, a transmitter section, and a shared programmable equalizer. The receiver section includes a low noise amplifier, a down conversion module, an analog to digital converter, and a digital demodulator. The low noise amplifier is operably coupled to amplify inbound radio frequency (RF) signals to produce amplified inbound RF signals. The down conversion module is operably coupled to convert the amplified inbound RF signals into low intermediate frequency (IF) signals. The analog to digital converter is operably coupled to convert the low IF signals into digital low IF signals. The digital demodulator is operably coupled to convert the digital low IF signals into inbound digital symbols and includes a baseband conversion module, a filtering module, the shared programmable equalizer, a CORDIC module, and a demodulation module. The baseband conversion module is operably coupled to convert the digital low IF signals into digital baseband signals. The filtering module is operably coupled to filter the digital baseband signals to produce filtered digital baseband signals. The shared programmable equalizer is operably coupled to equalize in-band frequency response of the receiver section such that the in-band frequency response of the receiver section approximates the frequency response of a square root raised cosine filter to produce adjusted digital baseband signals. The CORDIC module is operably coupled to produce phase and magnitude information from the adjusted digital baseband signals. The demodulation module is operably coupled to produce the inbound digital symbols from the phase and magnitude information.

The transmitter section includes a digital modulator, a digital to analog conversion module, an up-conversion module, and a power amplifier. The digital modulator is operably coupled to convert outbound digital symbols into outbound digital baseband signals and includes a pulse shaping module, a CORDIC module, the shared programmable equalizer, compensation module, an interpolation filter, and a re-quantization module. The pulse shaping module is operably coupled to square root raised cosine filter the outbound digital symbols to produce filtered digital symbols. The CORDIC module is operably coupled to convert phase and magnitude information of the filtered digital symbols into outbound signals. The shared programmable equalizer is operably coupled to produce equalized outbound signals by equalizing in-band frequency response of the transmitter section such that the in-band frequency response of the transmitter section approximates the frequency response of a square root raised cosine filter. The compensation module is operably coupled to compensate at least one of an imbalance and DC offset of the equalized outbound signals to produce compensated outbound signals. The interpolation filter is operably coupled to increase sampling rate of the compensated outbound signals to produce up-sampled outbound signals. The re-quantization module is operably coupled to quantize the up-sampled outbound signals to produce the outbound digital baseband signals. The digital to analog conversion module is operably coupled to convert the outbound digital baseband signals into outbound analog baseband signals. The up-conversion module is operably coupled to convert the outbound analog baseband signals into pre-amplified outbound RF signals. The power amplifier is operably coupled to amplify the pre-amplified outbound RF signals to produce the outbound RF signals.

BRIEF DESCRIPTION OF THE SEVERAL VIEWS OF THE DRAWINGS

FIG. 11 is a schematic block diagram of a transmitter section in accordance with the present invention;

FIG. 12 is a schematic block diagram of a digital modulator in accordance with the present invention;

DETAILED DESCRIPTION OF THE INVENTION

Figure 1:
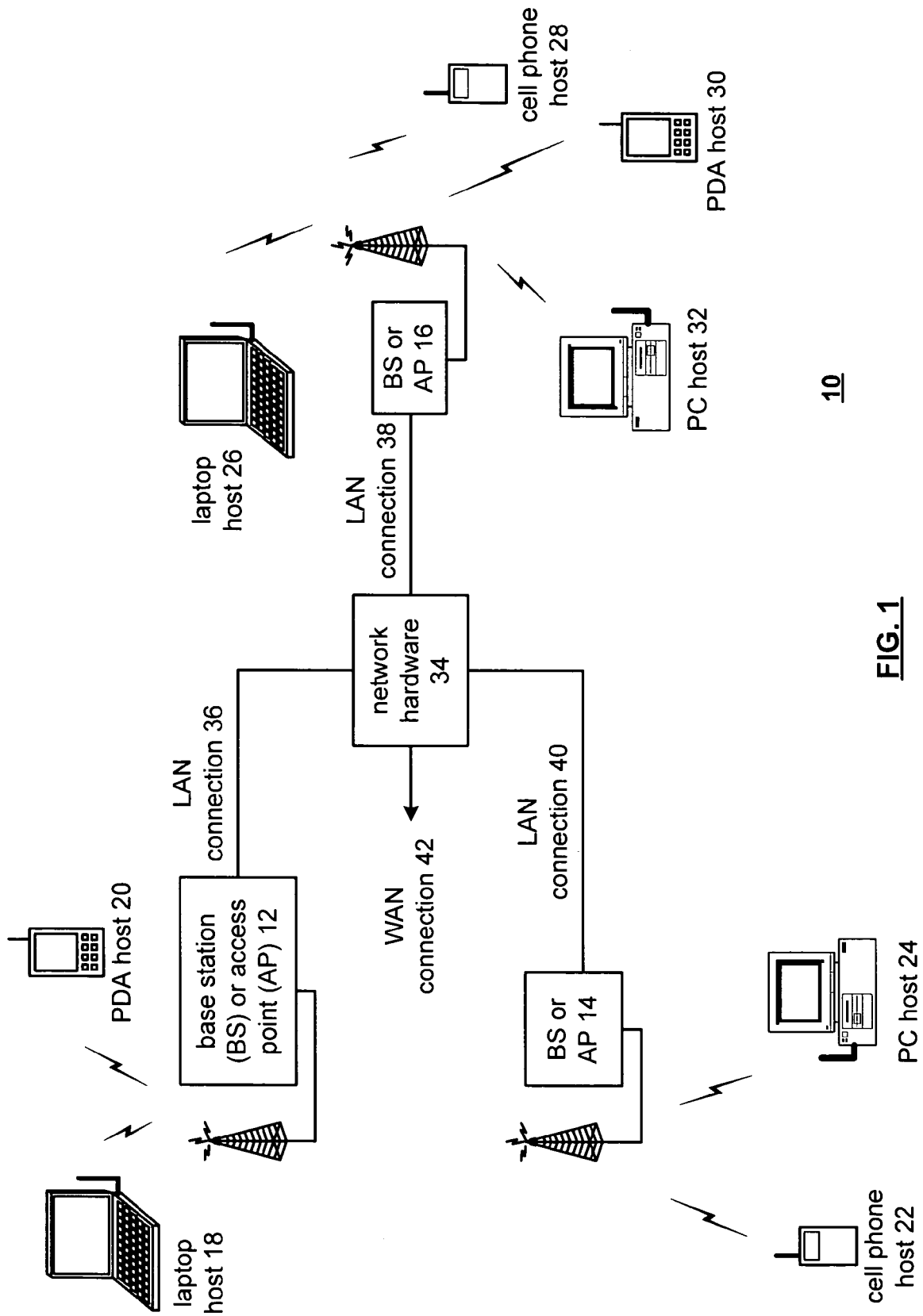
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
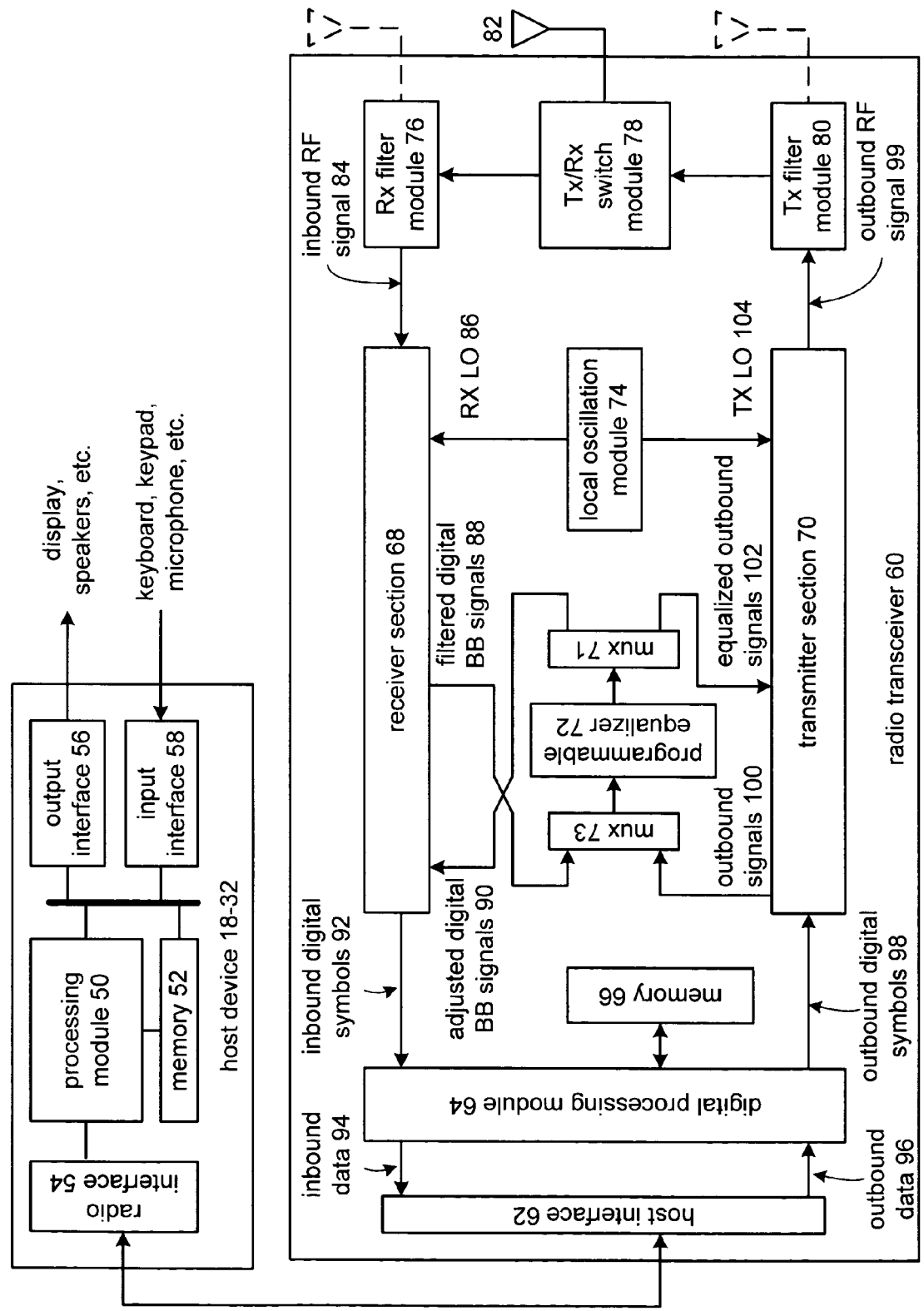
FIG. 2 is a schematic block diagram of a wireless communication device in accordance with the present invention.

FIG. 2 is a schematic block diagram illustrating a wireless communication device that includes the host device 18 32 and an associated radio transceiver 60. For cellular telephone hosts, the radio transceiver 60 is a built-in component. For personal digital assistants hosts, laptop hosts, and/or personal computer hosts, the radio transceiver 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio transceiver 60. For data received from the radio transceiver 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio transceiver 60 via the radio interface 54.

Radio transceiver 60 includes a host interface 62, digital processing module 64, memory 66, a receiver section 68, a transmitter section 70, a programmable equalizer 72, a local oscillation module 74, a receiver (RX) filter module 76, a transmit/receive (TX/RX) switch module 78, a TX filter module 80, and an antenna 82 The antenna implementation will depend on the particular standard to which the wireless communication device is compliant.

The digital processing module 64, in combination with operational instructions stored in memory 66, execute digital receiver functions and digital transmitter functions. The digital receiver functions include one or more of, but are not limited to, digital intermediate frequency to baseband conversion, demodulation, constellation demapping, decoding, and/or descrambling. The digital transmitter functions include one or more of, but are not limited to, scrambling, encoding, constellation mapping, modulation, and/or digital baseband to IF conversion. The digital processing module 64 may be implemented using an individual processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio transceiver 60 receives outbound data 96 from the host device via the host interface 62. The host interface 62 routes the outbound data 96 to the digital processing module 64, which processes the outbound data 96 in accordance with a particular wireless communication standard (e.g., IEEE 802.11, Bluetooth, et cetera) to produce outbound digital symbols 98. The outbound digital symbols 98 may be binary data, frequency shift keying (FSK) data, 2-bit phase shift keying (PSK) data, 3-bit PSK data, etc.

The transmitter section 70, which will be described in greater detail with reference to FIGS. 11 and 12, converts the outbound digital symbols 98 into outbound signals 100, which are provided to the programmable equalizer 72 via multiplexer (MUX) 73. As one of ordinary skill in the art will appreciate, the programmable equalizer 72 may be shared by the transmitter section 70 and the receiver section 68, where multiplexers 71 and 73 provide the appropriate connectivity when the transceiver 60 is in a transmit mode or in a receive mode. Alternatively, the transmitter section 70 and receiver section 68 may each include its own programmable equalizer 72, thus eliminating the need for the multiplexers 71 and 73. Regardless of the particular connectivity of the programmable equalizer 72, which will be described in greater detail with reference to FIGS. 5, 8-12, it processes the outbound signals 100 to produce equalized outbound signals 102. The transmitter section 70 converts the equalized outbound signals 102, which it may receive via multiplexer 71, into RF signals 99 in accordance with a transmit local oscillation (TX LO) 104. The transmitter filter module 80 filters the RF signals 99, which are routed to the antenna 82 via the Tx/Rx switch module 78. The antenna 82 transmits the outbound RF signals 99 to a targeted device such as a base station, an access point and/or another wireless communication device.

The radio transceiver 60 also receives inbound RF signals 84 via the antenna 82, which were transmitted by a base station, an access point, or another wireless communication device. The antenna 82 provides the inbound RF signals 84 to the receiver filter module 76 via the Tx/Rx switch module 78. The Rx filter 76 bandpass filters the inbound RF signals 84 and provides them to the receiver section 68, which will be described in greater detail with reference to FIGS. 3 and 4.

The receiver section 68 converts the inbound RF signals 84 into filtered digital baseband (BB) signals 88 in accordance with a receive local oscillation (RX LO) 86. In a shared programmable equalizer embodiment, the receiver section provides the filtered digital baseband signals 88 to the programmable equalizer 72 via multiplexer 73. The programmable equalizer 72 converts the filtered digital baseband signals 88 into adjusted digital baseband signals 90, which are provided back to the receiver section 68 via multiplexer 71. The receiver section 68 processes the adjusted digital baseband signals 90 to produce inbound digital symbols 92, which may be binary data, PSK data, and/or FSK data. The digital processing module 64 converts the inbound digital symbols 92 into inbound data 94. The host interface 62 provides the inbound data 94 to the host device 18-32 via the radio interface 54.

As one of average skill in the art will appreciate, the wireless communication device of FIG. 2 may be implemented using one or more integrated circuits. For example, the host device may be implemented on one integrated circuit, the digital processing module 64 and memory 66 may be implemented on a second integrated circuit, and the remaining components of the radio transceiver 60, less the antenna 82, may be implemented on a third integrated circuit. As an alternate example, the radio transceiver 60 may be implemented on a single integrated circuit. As yet another example, the processing module 50 of the host device and the digital processing module 64 may be a common processing device implemented on a single integrated circuit. Further, the memory 52 and memory 66 may be implemented on a single integrated circuit and/or on the same integrated circuit as the common processing modules of processing module 50 and the digital processing module 64.

Figure 3:
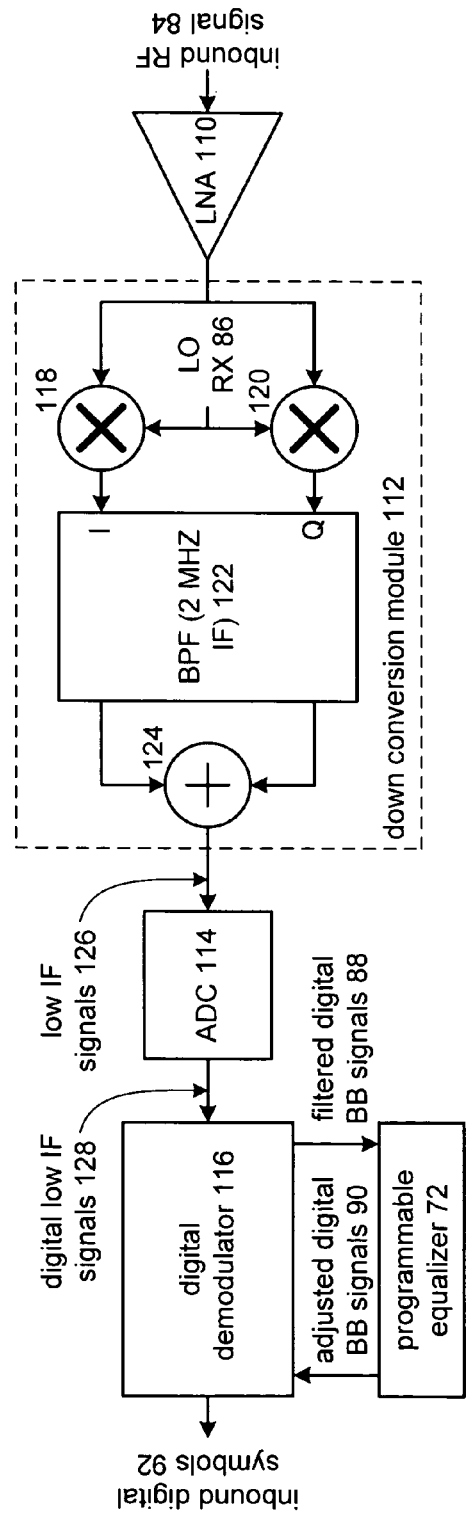
FIG. 3 is a schematic block diagram of a receiver section in accordance with the present invention.

FIG. 3 is a schematic block diagram of a receiver section 68 that includes a low noise amplifier 110, a down conversion module 112, an analog to digital converter section 114, and a digital demodulator 116. The down conversion module 112 includes mixers 118 and 120, a bandpass filter (BPF) 122, and a summing module 124. Note that when the programmable equalizer 72 is shared between the receiver section and the transmitter section, the digital demodulator 116 includes the programmable equalizer 72 when the transceiver 60 is in a receive mode. Alternatively, the digital demodulator 116 may include a dedicated equalizer 72.

In operation, the low noise amplifier 110 amplifies the inbound RF signals 84 to produce amplified inbound RF signals and provides them to the down conversion module 112. The mixers 118 and 120 mix the amplified inbound RF signals with an in-phase and quadrature component of the receiver local oscillation 86, respectively. The outputs of mixers 118 and 120 are filtered by bandpass filter 122, which may have a bandpass region of approximately 2 MHz. The bandpass filter 122 provides low intermediate frequency (IF) signals 126 to analog to digital converter module 114.

The analog-to-digital converter 114 converts the low IF signals 126 from the analog domain to the digital domain to produce digital low IF signals 128. The digital demodulator 116, which will be described in greater detail with reference to FIG. 4, converts the digital low IF signals 128 into the inbound digital symbols 92 using the programmable equalizer 72.

Figure 4:
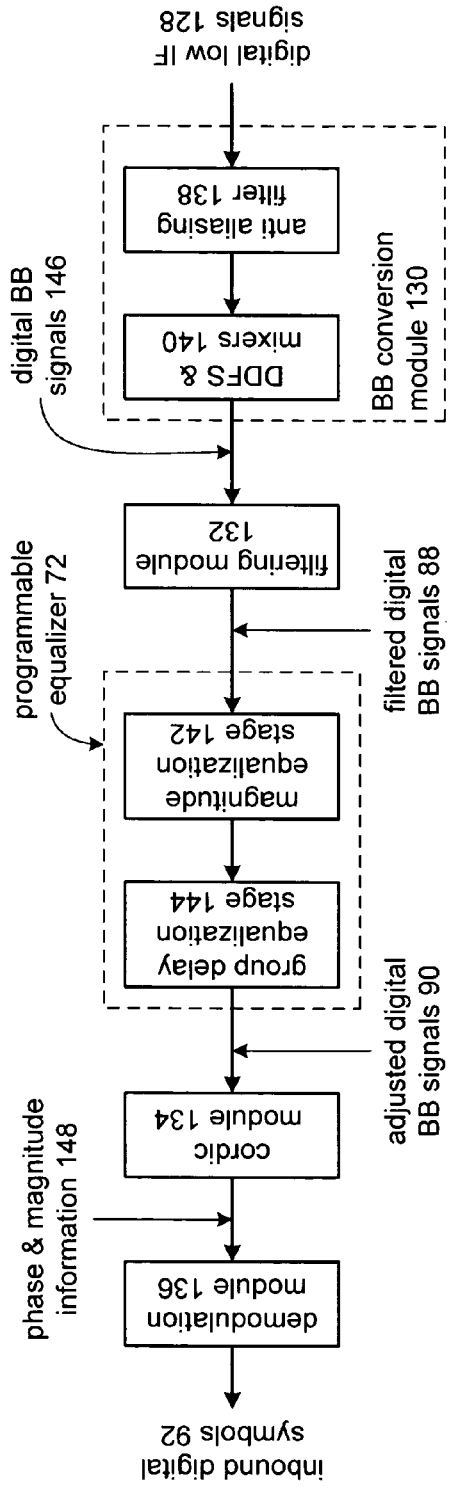
FIG. 4 is a schematic block diagram of a digital demodulator in accordance with the present invention.

FIG. 4 is a schematic block diagram of a digital demodulator 116 that includes a baseband conversion module 130, a filtering module 132, the programmable equalizer 72, a COordinate Rotation DIgital Computer (CORDIC) module 134, and a demodulation module 136. The baseband conversion module 130 includes an anti-aliasing filter 138 and a direct digital frequency synthesizer (DDFS) and mixers module 140. The programmable equalizer 72 includes a magnitude equalization stage 142 and a group delay equalization stage 144. The demodulation module 136 may include a PSK demodulator and/or a FSK demodulator.

In operation, the anti-aliasing filter 138 receives the digital low IF signals 128 and reduces the sampling rate of the digital low IF signals 128. For instance, for a Bluetooth Medium Rate Standard compliant receiver, the anti-aliasing filter 138 converts the radio of the digital low IF signals 128 from 48 MHz to 24 MHz. The Direct Digital Frequency Synthesizer (DDFS) and mixers module 140 translates the reduced sampling rate digital low IF signals to baseband, or DC. For example, for a Bluetooth Medium Rate Standard compliant receiver, the DDFS and mixers module converts a digital low IF signals from the 2 MHz IF to DC.

The filtering module 132, which will be described in greater detail with reference to FIGS. 6 and 7, may be a narrowband channel filter that passes the desired signal and attenuates undesired interferers and noise. The magnitude equalization stage 142 of the programmable equalizer 72 is operably coupled to equalize magnitude of the filtered digital baseband signals to produce magnitude equalized digital baseband signals. The group delay equalization stage 144 of the programmable equalizer 72 is operably coupled to equalize group delay of the magnitude equalized digital baseband signals to produce the adjusted digital baseband signals 90 such that the receiver section 68 has a particular magnitude and frequency response (e.g., a square root raised cosine function). An embodiment of the programmable equalizer 72 will be described in greater detail with reference to FIG. 5.

The COordinate Rotation DIgital Computer (CORDIC) then extracts phase and amplitude information 148 out of the received signal which may be delivered to an FSK demodulator or a PSK demodulator of the demodulation module 136, depending upon the mode of modulation.

Figure 5:
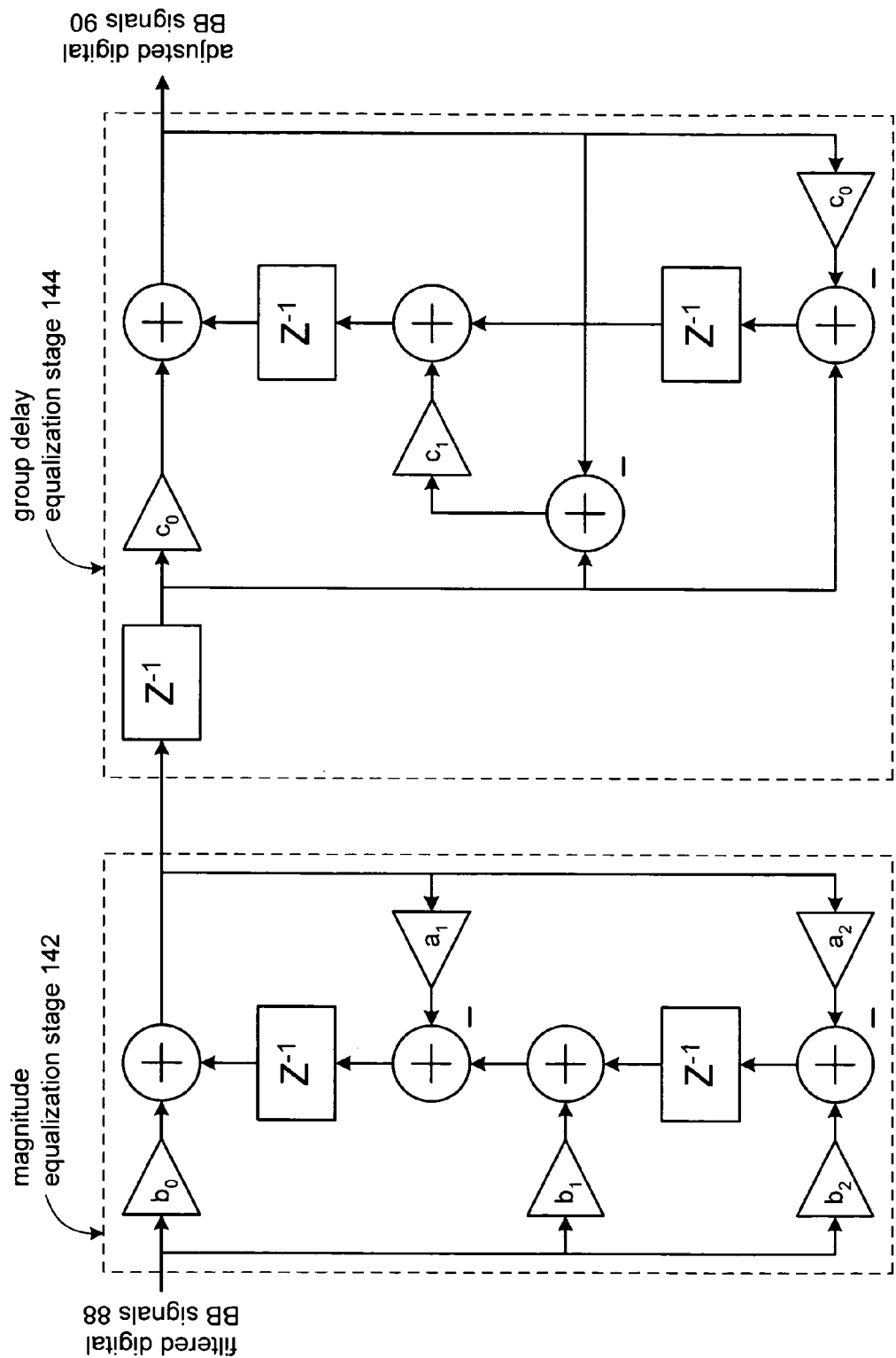
FIG. 5 is a schematic block diagram of a programmable equalizer in accordance with the present invention.

FIG. 5 is a schematic block diagram of an embodiment of the programmable equalizer 72 that includes the magnitude equalization module 142 and the group delay equalization module 144. As shown, each of the equalization modules 142 and 144 may be an infinite impulse response (IIR) filter. In one embodiment, the IIR filters are second-order IIR filters; where the first section performs magnitude response equalization, while the second section performs group delay response equalization. Equivalently, the phase response of the second section is such that the overall phase response of the receiver path is linear. In an embodiment for medium rate Bluetooth, the IIR filters are clocked at 12 MHz, where the magnitude equalizer section has a transfer function of the form $$H_{ME}(z) = \frac{b_0 + b_1 z^{-1} + b_2 z^{-2}}{1 + a_1 z^{-1} + a_2 z^{-2}},$$

while the group delay equalizer section has a transfer function of the form $$H_{GE}(z) = \frac{c_0 + c_1 z^{-1} + z^{-2}}{1 + c_1 z^{-1} + c_0 z^{-2}},$$

and where the filter coefficients are chosen such that the equalization function obtained yields an overall in-band frequency response of the receiver that approximates a square root raised cosine filter for medium rate Bluetooth.

Figures 7, 8:
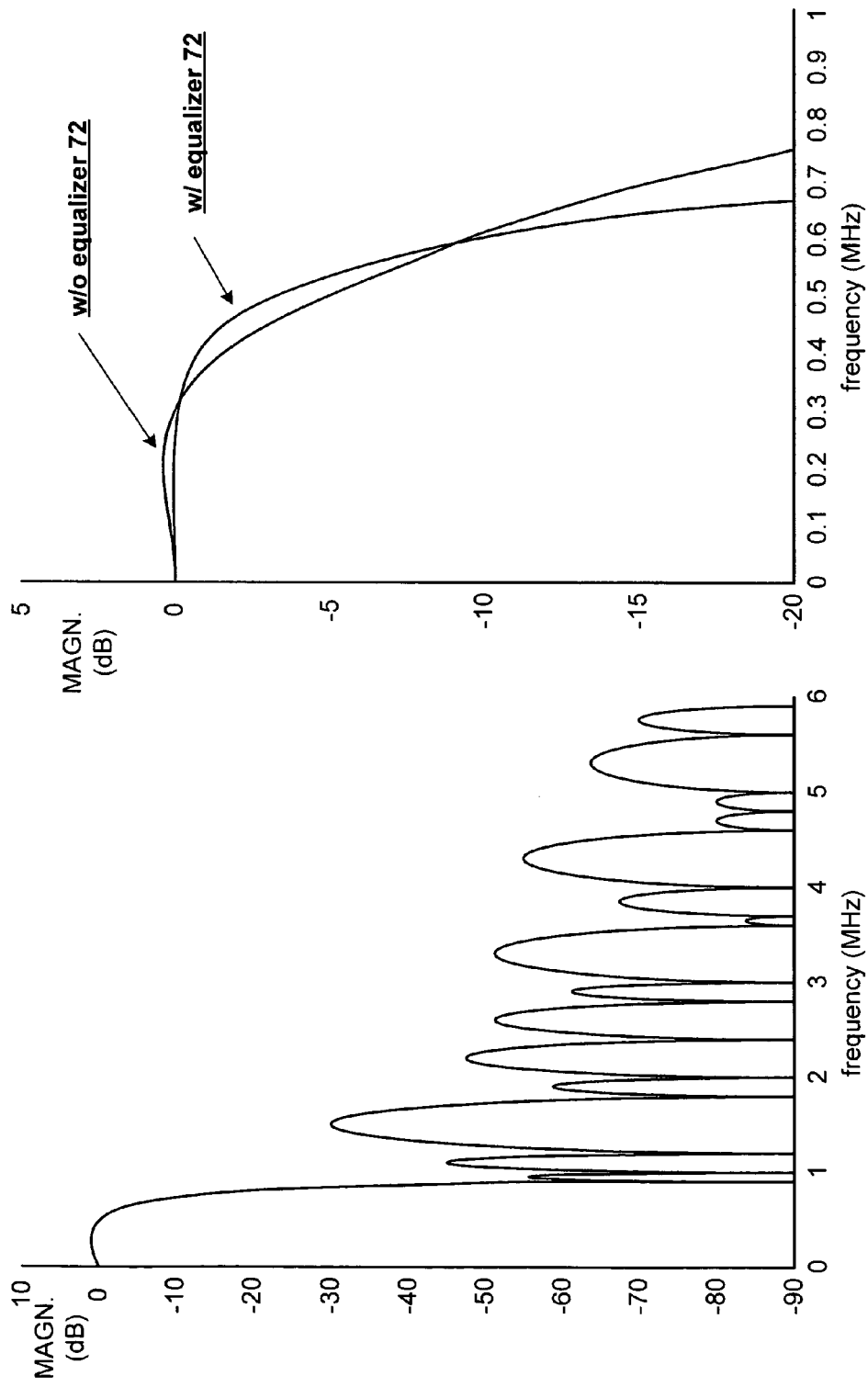
FIG. 7 is a diagram of the response of the filter module of FIG. 6.
FIG. 8 is a diagram of the response of the receiver section in accordance with the present invention.

To further illustrate the functionality of the programmable equalizer 72 for the Medium Rate Bluetooth standard, it is desired that the overall magnitude and phase response of the receiver path is equal to that of a square Root Raised Cosine (RRC) filter with a roll-off factor of 0.4 as is shown in FIG. 8. With this type of filter response in wireless transceivers, the receiver can sample the transmitted symbols with minimal inter-symbol interference and hence optimize the transceivers resistance towards noise and interferers when the transmitter filters the transmitted symbols with an approximately identical filter. The programmable equalizer 72 enables the receiver's response to approximate the desired RRC filter response.

Figure 6:
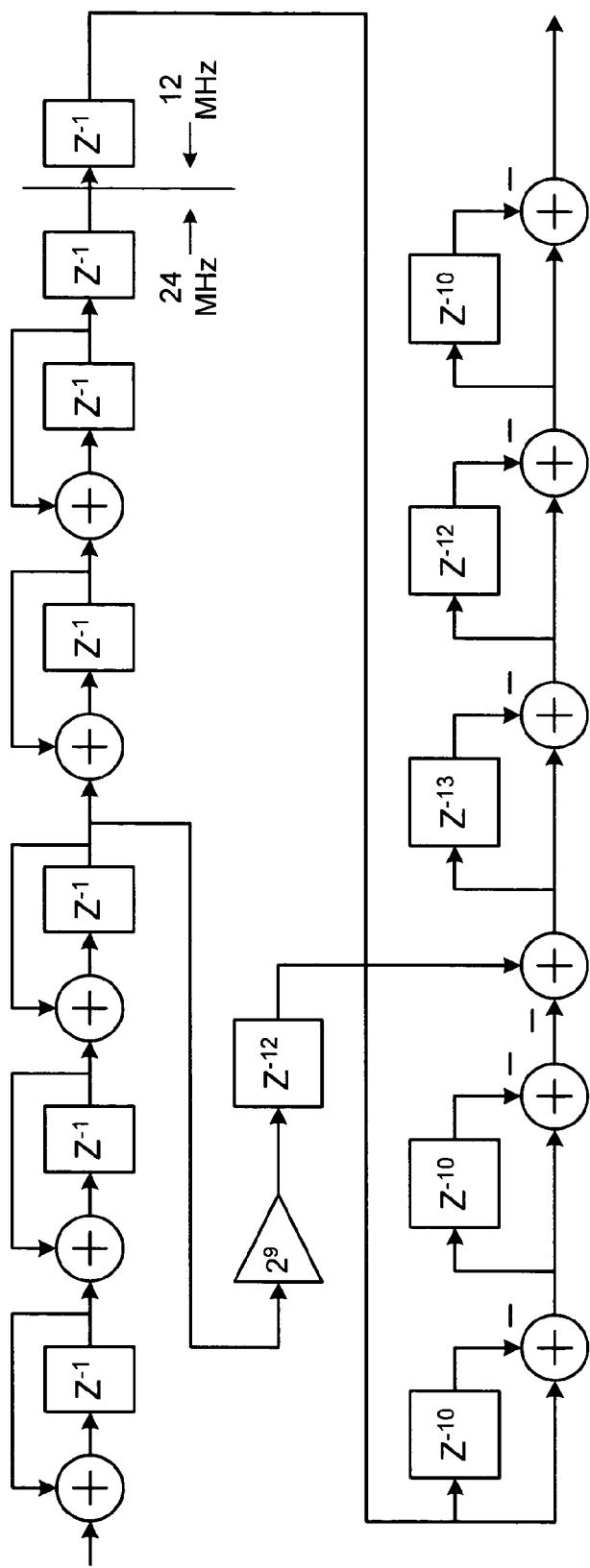
FIG. 6 is a schematic block diagram of a filter module of the digital demodulator in accordance with the present invention.

FIG. 6 is a schematic block diagram of a filter module 132 of the digital demodulator 150 digital demodulator 116. The filter may be a real-coefficient, symmetric FIR filter such that the phase response is linear and have the response as shown in FIG. 7.

Figure 9:
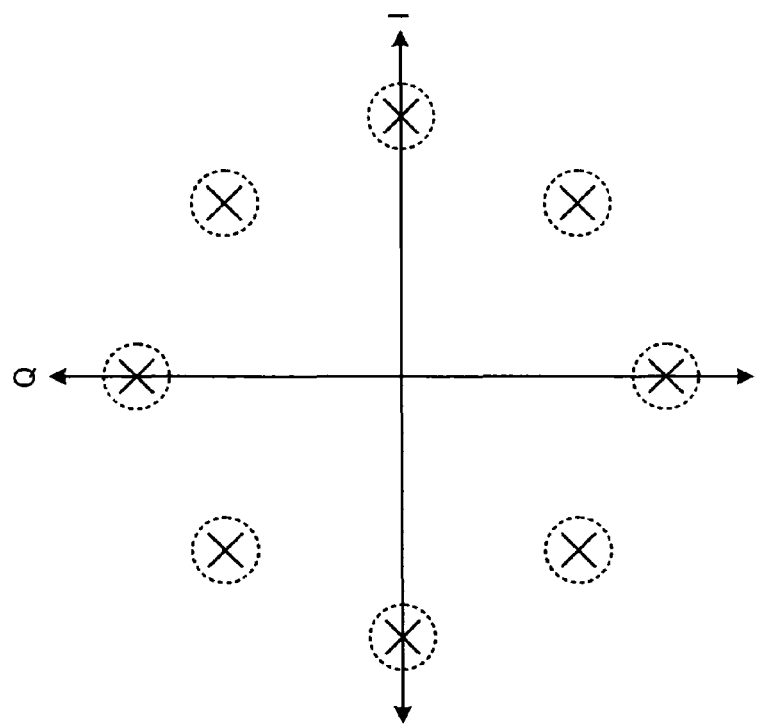

FIG. 9 indicates a typical scatter plot of the receiver output of the receiver of FIG. 3 with the programmable equalizer 72 activated to adjust the magnitude and phase response of the receiver such that it closely resembles that of the RRC filter with roll-off factor 0.4. As can be seen for 3-bit PSK, the constellation points are substantially non-overlapping resulting in improved robustness against noise in the transmission path.

Figure 10:
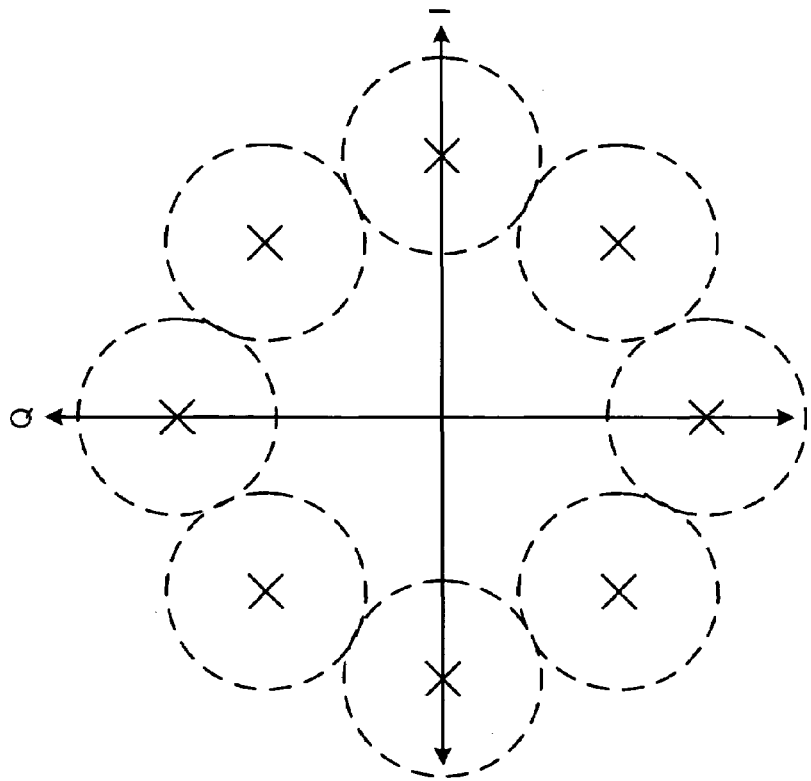
FIGS. 9 and 10 are scatter plots in accordance with the receiver of FIG. 3.

FIG. 10 indicates a typical scatter plot of the receiver output for the receiver of FIG. 3 without the programmable equalizer 72. As shown, the constellation points have a rather large deviation from ideal sampling points and, as such, this system is not as robust against noise and interferers as the system of FIG. 9.

FIG. 11 is a schematic block diagram of a transmitter section 70 that includes a digital modulator 150, a digital to analog conversion module 152, an up-conversion module 154, and a power amplifier 156. The up-conversion module 154 includes low pass filters (LPF) 158 and 160, mixers 162 and 164, and a summing module 166.

In operation, the digital modulator 150, which will be described in greater detail with reference to FIG. 12, converts the outbound digital symbols 98 into outbound digital baseband signals 168 having an in-phase (I) component and a quadrature (Q) component. The digital to analog conversion module 152 converts the outbound digital baseband signals 168 into analog baseband signals.

The low pass filters 158 and 160 of the up-conversion module 154 filter the analog baseband signals to produce filtered signals. Mixers 162 and 164 mix the filtered signals with in-phase and quadrature components of the transmit local oscillation 104 to produce mixed signals. The summation module 166 sums the mixed signals and filters out the undesired components to produce the RF signals. The power amplifier 156 amplifies the RF signals prior to transmission via the antenna 82.

FIG. 12 is a schematic block diagram of a digital modulator 150 that includes a pulse shaping module 170, a CORDIC module 172, the programmable equalizer 72, a compensation module 174, an interpolation filter 176, and a re-quantization module 178. The compensation module 174 includes an IQ imbalance compensation module 180 and/or a DC offset compensation module 182.

Figure 13:
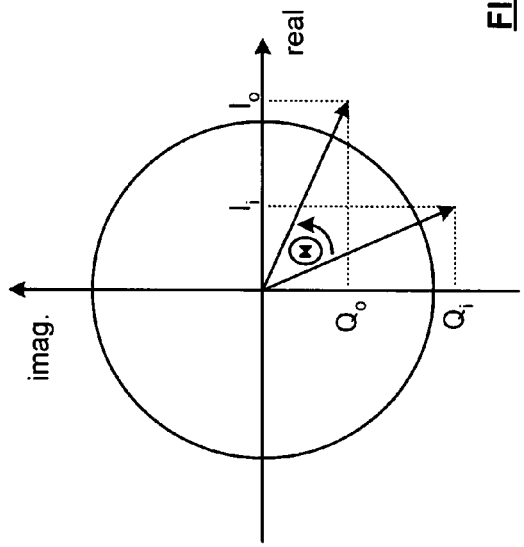
FIG. 13 is a diagram of a CORDIC function in accordance with the present invention.

In operation, the pulse shaping module 170 impose an RRC filtering on the data symbols 98 to limit the bandwidth of the transmitted RF power spectrum, yet allowing for inter-symbol interference (ISI) free sampling of the symbols provided the receiver imposes an RRC filter on the incoming signal. The CORDIC module 172 converts the filtered digital symbols by rotating the symbol vector by an amount determined by the phase rotation angle Θ to produce outbound signals. In particular, a non-zero IF frequency can be chosen if Θ equals a ramp. This rotation function is depicted in FIG. 13.

Figure 14:
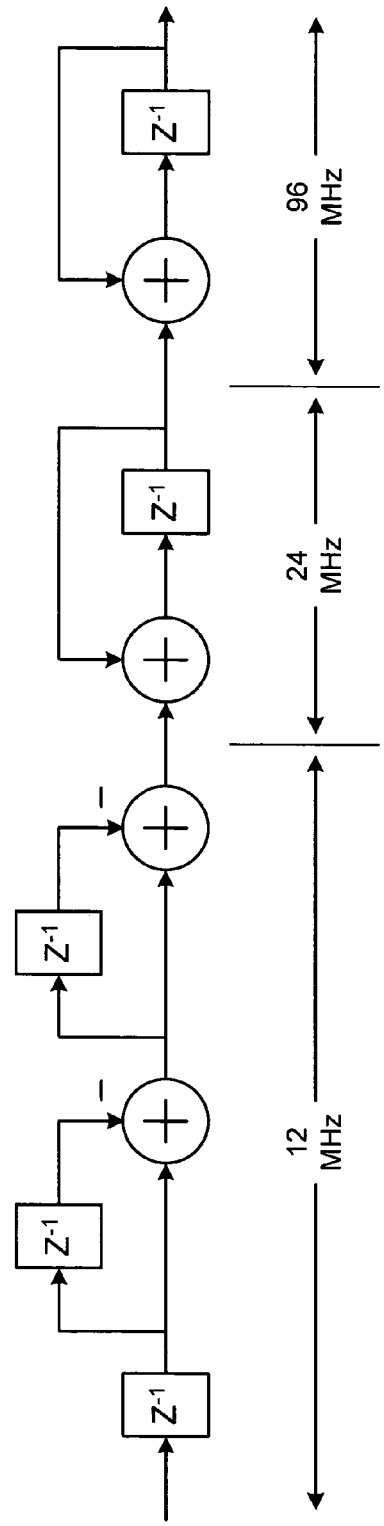
FIG. 14 is a schematic block diagram of an interpolation filter in accordance with the present invention.
Figure 15:
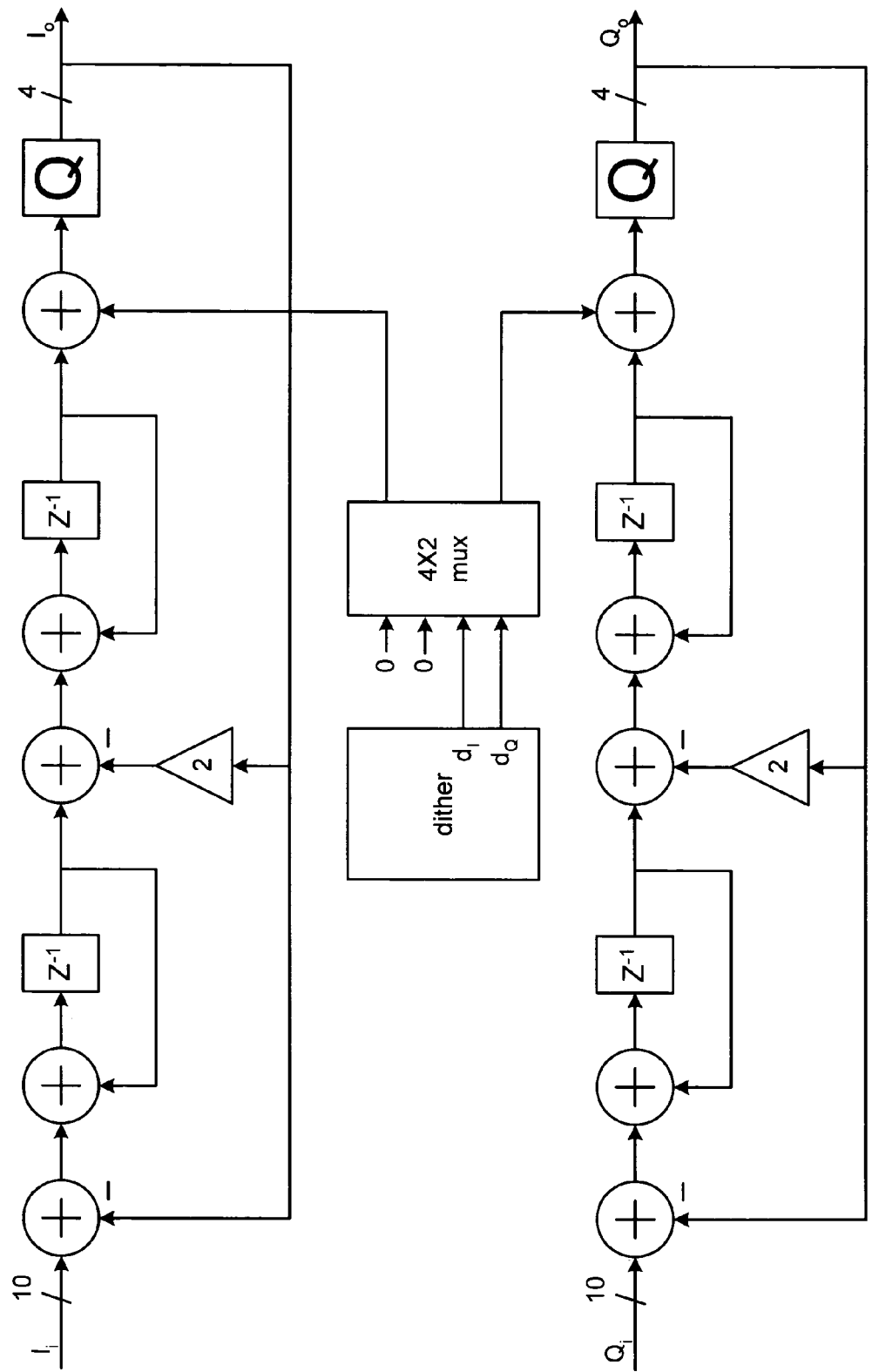
FIG. 15 is a schematic block diagram of a re-quantization module in accordance with the present invention.

Returning to the discussion of FIG. 12, the programmable equalizer 72 functions to pre-distort the signal such that the overall filtering of the transmitter section closely resembles that of a RRC filter with roll-off factor 0.4. The I/Q imbalance and DC offset modules 180 and 182 function to digitally compensate for IQ imbalances and DC offsets, respectively, to produce compensated outbound signals. The interpolation filter, an embodiment of which is illustrated in FIG. 14, increases the sampling rate of the compensated outbound signals to produce up-sampled outbound signals. For example, for a medium rate Bluetooth application, the sampling rate may be change from 12 MHz to 96 MHz with little signal distortion. The re-quantization module, which may operating at 96 MHz for medium rate Bluetooth applications, quantizes the output signal to 4 bits in such a way that most of the quantization noise is outside the frequency range of interest, which can be filtered by a passive component filter within the up-conversion module. FIG. 15 illustrates a schematic block diagram of an embodiment of the re-quantization module 178.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a programmable equalizer that may be used in a receiver and/or in a transmitter to improve performance of a radio transmitter. As one of ordinary skill in the art will appreciate, other embodiments may be derived from the teachings of the present invention without deviating from the scope of the claims.

What is claimed is:

1. A radio receiver comprising:

a low noise amplifier operably coupled to amplify inbound radio frequency (RF) signals to produce amplified inbound RF signals;

down conversion module operably coupled to convert the amplified inbound RF signals into low intermediate frequency (IF) signals;

analog to digital converter operably coupled to convert the low IF signals into digital low IF signals; and a digital demodulator operably coupled to convert the digital low IF signals into inbound digital symbols, wherein the digital demodulator includes:
baseband conversion module operably coupled to convert the digital low IF signals into digital baseband signals;
filtering module operably coupled to filter the digital baseband signals to produce filtered digital baseband signals;
programmable equalizer operably coupled to equalize frequency response of the filtered digital baseband signals such that in-band frequency response of the radio receiver approximates frequency response of a square root raised cosine filter to produce adjusted digital baseband signals;
COordinate Rotation DIgital Computer (CORDIC) module operably coupled to produce phase and magnitude information from the adjusted digital baseband signals; and
demodulation module operably coupled to produce the inbound digital symbols from the phase and magnitude informnation.

2. The radio receiver of claim 1, wherein the programmable equalizer comprises:
a magnitude equalization stage operably coupled to equalize magnitude of the filtered digital baseband signals to produce magnitude equalized digital baseband signals; and
a group delay equalization stage operably coupled to equalize group delay of the magnitude equalized digital baseband signals to produce the adjusted digital baseband signals.

3. The radio receiver of claim 2, wherein the magnitude equalization stage comprises:
an infinite impulse response (IIR) filter having a transfer function approximating:

$$H_{ME}(z) = \frac{b_0 + b_1 z^{-1} + b_2 z^{-2}}{1 + a_1 z^{-1} + a_2 z^{-2}},$$

where $b_0$, $b_1$, $b_2$, $a_1$ and $a_2$ are coefficients.

4. The radio receiver of claim 2, wherein the group delay equalization stage comprises:
an infinite impulse response (IIR) filter having a transfer function approximating:

$$H_{GE}(z) = \frac{c_0 + c_1 z^{-1} + z^{-2}}{1 + c_1 z^{-1} + c_0 z^{-2}},$$

where $c_0$ and $c_1$ are coefficients.

5. The radio receiver of claim 1, wherein the inbound digital symbols comprises at least one of:
multi-bit phase shift keying data; and
binary frequency shift keying data.

6. A radio transmitter comprising:
a digital modulator operably coupled to convert outbound digital symbols into outbound digital baseband signals, wherein the digital modulator includes:
pulse shaping module operably coupled to square root raised cosine filter the outbound digital symbols to produce filtered digital symbols;
COordinate Rotation DIgital Computer (CORDIC) module operably coupled to convert phase and magnitude information of the filtered digital symbols into outbound signals;
programmable equalizer operably coupled to produced equalized outbound signals by equalizing frequency response of the outbound signals such that in-band frequency response of the radio transmitter approximates frequency response of a square root raised cosine filter;
compensation module operably coupled to compensate at least one of an imbalance and DC offset of the equalized outbound signals to produce compensated outbound signals;
an interpolation filter operably coupled to increase sampling rate of the compensated outbound signals to produce up-sampled outbound signals; and
a re-quantization module operably coupled to quantize the up-sampled outbound signals to produce the outbound digital baseband signals;
digital to analog conversion module operably coupled to convert the outbound digital baseband signals into outbound analog baseband signals;
up-conversion module operably coupled to convert the outbound analog baseband signals into pre-amplified outbound RF signals; and
a power amplifier operably coupled to amplify the pre-amplified outbound RF signals to produce the outbound RF signals.

7. The radio transmitter of claim 6, wherein the programmable equalizer comprises:
a magnitude equalization stage operably coupled to equalize magnitude of the outbound signals to produce magnitude equalized outbound signals; and
a group delay equalization stage operably coupled to equalize group delay of the magnitude equalized outbound signals to produce the equalized outbound signals.

8. The radio transmitter of claim 7, wherein the magnitude equalization stage comprises:
an infinite impulse response (IIR) filter having a transfer function approximating:

$$H_{ME}(z) = \frac{b_0 + b_1 z^{-1} + b_2 z^{-2}}{1 + a_1 z^{-1} + a_2 z^{-2}},$$

where $b_0$, $b_1$, $b_2$, $a_1$ and $a_2$ are coefficients.

9. The radio transmitter of claim 7, wherein the group delay equalization stage comprises:
an infinite impulse response (IIR) filter having a transfer function approximating:

$$H_{GE}(z) = \frac{c_0 + c_1 z^{-1} + z^{-2}}{1 + c_1 z^{-1} + c_0 z^{-2}},$$

where $c_0$ and $c_1$ are coefficients.

10. The radio transmitter of claim 6, wherein the outbound digital symbols comprises at least one of:
multi-bit phase shift keying data; and
binary frequency shift keying data.

11. A radio transceiver comprising:
a receiver section;
a transmitter section; and a shared programmable equalizer,
wherein the receiver section includes:
  a low noise amplifier operably coupled to amplify inbound radio frequency (RF) signals to produce amplified inbound RF signals;
  down conversion module operably coupled to convert the amplified inbound RF signals into low intermediate frequency (IF) signals;
  analog to digital converter operably coupled to convert the low IF signals into digital low IF signals; and
  a digital demodulator operably coupled to convert the digital low IF signals into inbound digital symbols, wherein the digital demodulator includes:
    baseband conversion module operably coupled to convert the digital low IF signals into digital baseband signals;
    filtering module operably coupled to filter the digital baseband signals to produce filtered digital baseband signals;
    the shared programmable equalizer operably coupled to equalize in-band frequency response of the receiver section such that the in-band frequency response of the receiver section approximates the frequency response of a square root raised cosine filter to produce adjusted digital baseband signals;
    COordinate Rotation DIgital Computer (CORDIC) module operably coupled to produce phase and magnitude information from the adjusted digital baseband signals; and
    demodulation module operably coupled to produce the inbound digital symbols from the phase and magnitude information;
wherein the transmitter section includes:
  a digital modulator operably coupled to convert outbound digital symbols into outbound digital baseband signals, wherein the digital modulator includes:
    pulse shaping module operably coupled to square root raised cosine filter the outbound digital symbols to produce filtered digital symbols;
    COordinate Rotation DIgital Computer (CORDIC) module operably coupled to convert phase and magnitude information of the filtered digital symbols into outbound signals;
    the shared programmable equalizer operably coupled to produce equalized outbound signals by equalizing in-band frequency response of the transmitter section such that the in-band frequency response of the transmitter section approximates the frequency response of a square root raised cosine filter;
    compensation module operably coupled to compensate at least one of an imbalance and DC offset of the equalized outbound signals to produce compensated outbound signals;
    an interpolation filter operably coupled to increase sampling rate of the compensated outbound signals to produce up-sampled outbound signals; and
    a re-quantization module operably coupled to quantize the up-sampled outbound signals to produce the outbound digital baseband signals;
    digital to analog conversion module operably coupled to convert the outbound digital baseband signals into outbound analog baseband signals;
    up-conversion module operably coupled to convert the outbound analog baseband signals into pre-amplified outbound RF signals; and
    a power amplifier operably coupled to amplify the pre-amplified outbound RF signals to produce the outbound RF signals.

12. The radio transceiver of claim 11, wherein the shared programmable equalizer comprises:
  a magnitude equalization stage operably coupled to:
    equalize magnitude of the filtered digital baseband signals to produce magnitude equalized digital baseband signals when the receiver section is active; and
    equalize magnitude of the outbound signals to produce magnitude equalized outbound signals when the transmitter section is active; and
  a group delay equalization stage operably coupled to:
    equalize group delay of the magnitude equalized digital baseband signals to produce the adjusted digital baseband signals when the receiver section is active; and
    equalize group delay of the magnitude equalized outbound signals to produce the equalized outbound signals when the transmitter section is active.

13. The radio transceiver of claim 12, wherein the magnitude equalization stage comprises:
  an infinite impulse response (IIR) filter having a transfer function approximating:

$$H_{ME}(z) = \frac{b_0 + b_1 z^{-1} + b_2 z^{-2}}{1 + a_1 z^{-1} + a_2 z^{-2}},$$

where $b_0$, $b_1$, $b_2$, $a_1$ and $a_2$ are coefficients.

14. The radio transceiver of claim 12, wherein the group delay equalization stage comprises:
  an infinite impulse response (IIR) filter having a transfer function approximating:

$$H_{GE}(z) = \frac{c_0 + c_1 z^{-1} + z^{-2}}{1 + c_1 z^{-1} + c_0 z^{-2}},$$

where $c_0$ and $c_1$ are coefficients.

15. The radio transceiver of claim 11, wherein the inbound digital symbols comprises at least one of:
  multi-bit phase shift keying data; and
  binary frequency shift keying data.

16. The radio transceiver of claim 11, wherein the outbound digital symbols comprises at least one of:
  multi-bit phase shift keying data; and
  binary frequency shift keying data.

* * * * *